United States Patent [19]

Buhofer et al.

[11] Patent Number: 5,730,570
[45] Date of Patent: Mar. 24, 1998

[54] FASTENING ELEMENTS TO BE DRIVEN INTO HARD RECEIVING MATERIALS

[75] Inventors: Tobias Buhofer, Zürich, Switzerland; Günter Rohrmoser, Meiningen, Austria

[73] Assignee: Hilti Aktiengesellschaft, Furstentum, Liechtenstein

[21] Appl. No.: 742,838

[22] Filed: Nov. 1, 1996

[30] Foreign Application Priority Data

Nov. 17, 1995 [DE] Germany ................. 195 42 949.4

[51] Int. Cl.$^6$ ................. F16B 15/00; B21G 3/00
[52] U.S. Cl. ................. 411/441; 411/440; 411/490; 470/34
[58] Field of Search ................. 441/440, 441, 441/487, 490, 900, 901, 923; 470/34, 38

[56] References Cited

U.S. PATENT DOCUMENTS

| | | | |
|---|---|---|---|
| 3,505,919 | 4/1970 | Batliner et al. | 411/440 |
| 4,209,889 | 7/1980 | Silva et al. | |
| 4,979,858 | 12/1990 | Van Allman et al. | 411/441 |
| 4,986,709 | 1/1991 | Hachtel et al. | 411/441 X |
| 5,286,153 | 2/1994 | Sartor et al. | 411/441 |

FOREIGN PATENT DOCUMENTS

| | | |
|---|---|---|
| 640695 | 3/1995 | European Pat. Off. |
| 1272300 | 8/1961 | France . |
| 725310 | 3/1955 | United Kingdom . |
| 1224489 | 3/1971 | United Kingdom . |

*Primary Examiner*—Neill R. Wilson
*Attorney, Agent, or Firm*—Anderson, Kill & Olick, P.C.

[57] ABSTRACT

A fastening element such as a bolt, nail and the like to be driven into a receiving material, is formed of a high corrosion resistant steel. The fastening element has an axially extending leading region (1) to be driven into the receiving material and trailing region (2) with the two regions forming a single monolithic member. The diameter of the trailing region (2) is greater than that of the leading region (1) and has a hardness in the range of 35–43 Rockwell C hardness while the leading region has a hardness in the range of 46–55 Rockwell C hardness.

7 Claims, 1 Drawing Sheet

FASTENING ELEMENTS TO BE DRIVEN INTO HARD RECEIVING MATERIALS

BACKGROUND OF THE INVENTION:

The present invention is directed to steel fastening elements, such as bolts, nails and the like having a leading region to be secured in a receiving material and a trailing region having a diameter greater than the diameter of the leading region, and with the two regions being formed monolithically as a single member.

In fastening element field, particularly where the fastening elements are in the form of bolt, nails and the like, the elements are used to secure objects to hard receiving materials, such as concrete, rock and metal. These fastening elements comprise an axially extending shank with a tapering tip at one end and a trailing region for securing the object to the receiving material where the trailing region has a diameter greater than the diameter of the shank. These fastening elements are driven directly into hard receiving material without drilling a borehole for the element.

The fastening element is driven by means of a manually operated explosive powder charge setting tool. Since the driving operation is completed within a fraction of a second, the load acting on the fastening element is very high. The highest loads or stresses are generated in the leading end region of the shank where the fastening element has to displace the receiving material as it is being driven. To avoid damage to the fastening element it must be of very high strength. Such high strength, however, has a negative effect upon the necessary toughness of the overall fastening element.

In DE-PS 1 009 570 a fastening element is disclosed with a leading region and a trailing region and the trailing region has a thread. The fastening element can be driven, at least partially, into the receiving material by explosive powder force. The trailing region projecting from the receiving material is used to secure an object to the receiving material.

The leading region of the fastening element is formed basically by an axially extending cylindrical shank with a tapering tip at its leading end. The trailing region extends from the leading region so that they are formed as a single member and the diameter of the trailing region exceeds the diameter of the leading region. To be able to drive the known fastening element into a receiving material, the fastening element must have an appropriately high hardness. Since the toughness of the fastening element diminishes with increasing hardness, there is the possibility of failure of the fastening element due to high jerk-like loads developed by the object being attached.

Another fastening element is disclosed in DE-OS 41 39 653. This fastening element is formed of a leading region having a high strength so that it can be driven into a hard receiving material with an adjacent low strength region surrounding the leading region. The leading region is formed of a corrosion resistant steel and comprises a shank which tapers in the leading direction towards the tip. In the trailing end region spaced from the tip, there is a small collar having a diameter exceeding that of shank and in the course of the driving operation of the fastening element, the collar displaces the low strength region against the surface of the receiving material, the trailing end region can be formed with an outside thread or a head portion.

The leading region is manufactured from a blank having a diameter corresponding to the diameter of the shank. The blank has such a high strength due to the high degree of deformation, that only a small collar can be upset on the shank by cold or semi-hot deformation.

Dynamic tensile forces action on the trailing end, developed by an object being attached to the receiving material, must be carried by the small collar, and in particular in the case of a jerk-like load acting on the fastening element, failure can occur due to insufficient overtightening which can be attributed to the small collar cooperating with the adjacent region. Further, the two part arrangement of the fastening element requires an expensive manufacturing procedure.

SUMMARY OF THE INVENTION

Therefore, the primary object of the present invention is to provide a fastening element which can be simply and economically manufactured and can be driven effectively into hard receiving materials. The fastening element is intended to secure objects to the hard receiving material and the fastening element must be capable of carrying high dynamic loads developed by the object being attached to the receiving material.

In accordance with the present invention, the fastening element is formed of a leading region and a trailing region and the trailing region has a Rockwell C hardness in a range of 35–43 and the leading region has a Rockwell C hardness in the range 46–55.

With the fastening element of the present invention, the leading region can be driven into a hard receiving material, the following trailing region secures the object to be connected by the fastening element. The surface of the trailing region projects radially outwardly from the outside surface of the leading region. The hardness of the trailing region in the range of 35–43 Rockwell C hardness and the hardness of the leading end region in the range of 46–55 Rockwell C hardness afford the ability of the trailing region to absorb jerk-like dynamic loads developed by the object being attached to the receiving material. The shape and the hardness of a material can be changed through deformation, such as cold extrusion or hammering. The limit of deformation of the material is characterized as the "degree of deformation." The maximum deformation of a material is in accordance with a degree of deformation of 100%. The "degree of deformation" is the percentage deformation of the leading region and trailing region from the initial material.

Preferably, the trailing region has a degree of deformation of 20% to 55% while the leading region has a degree of deformation of 70% to 80% in order to provide a lower strength and thus a higher toughness for the trailing region as compared to the leading region.

The original or initial material of the fastening element can be a steel wire manufactured by drawing and it can be further strain hardened by cold extrusion or hammering in the leading region so that the hardness increases in such region.

Preferably, a good driving behavior of the fastening element is obtainable by using a leading region which is shaped as a cylindrical shank and tapers to its leading end. It is possible to taper the shank inwardly to a tip.

The trailing region, extending from the leading region, is advantageously provided with an external thread. A detachable connection of an object to the receiving material is thereby possible.

An object can be fixed to the surface of the receiving material by a fastening element where the trailing region is shaped as a nail head. Such a fastening element is simply constructed can be manufactured economically, and is capable of carrying jerk-like dynamic tensile loads and lateral loads developed by the object being secured to the receiving material.

A fastening element having a high corrosion resistance can be formed by a nitrogen alloyed, austenitic steel having a content of:

2–22% Mn
1–3% Mo
0.2–1.2% N
15–26% Cr
0–17% Ni.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION

Figure 1:
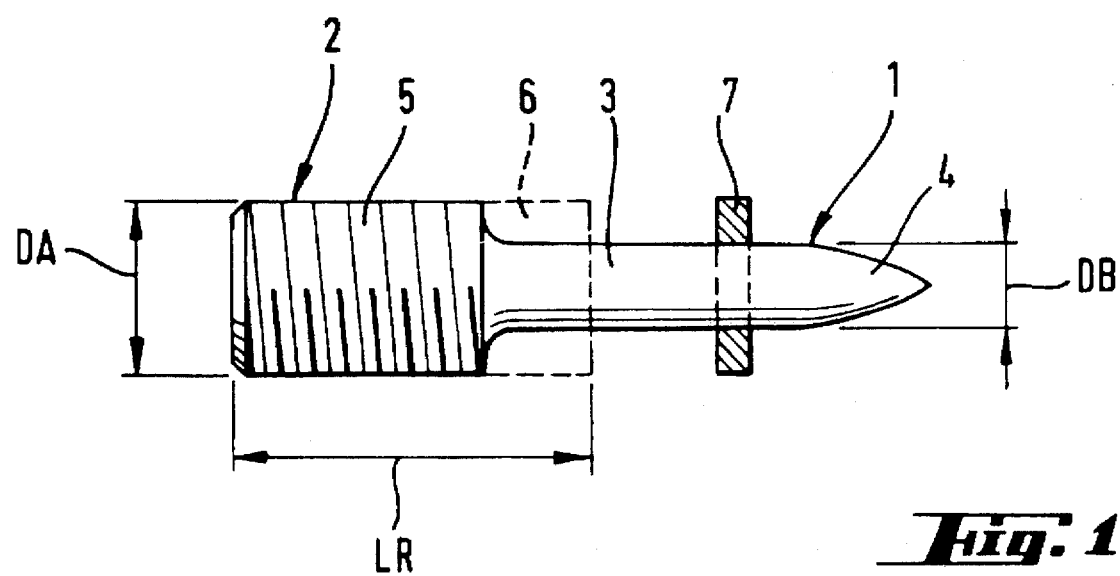
FIG. 1 is an axially extending side view of a fastening element embodying the present invention with a washer placed on its leading region.
Figure 2:
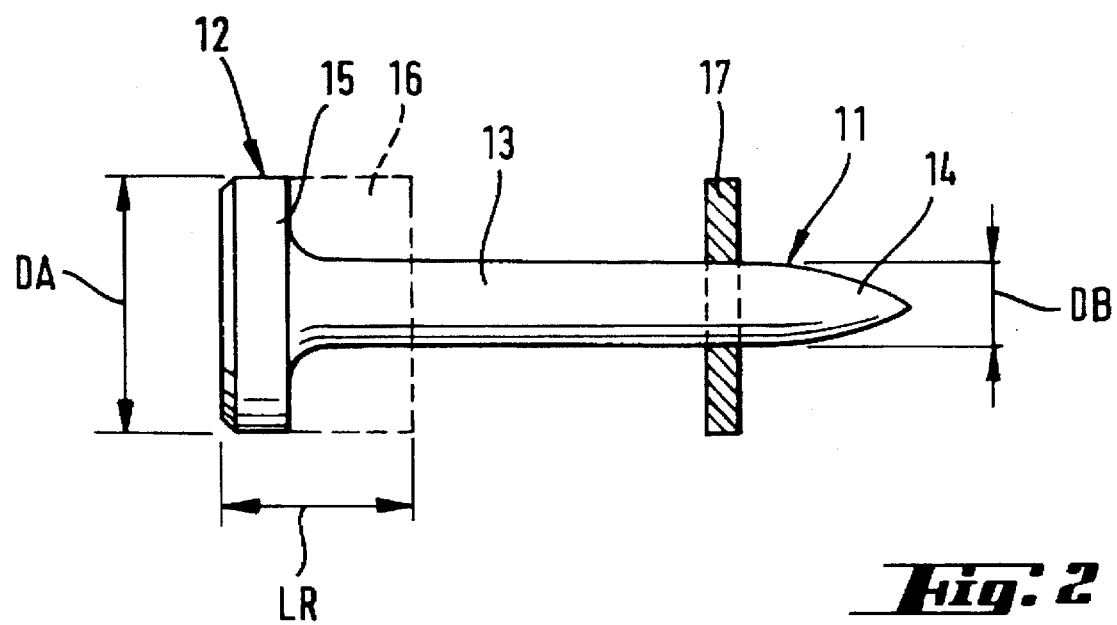
FIG. 2 is an axially extending side view, similar to FIG. 1, of another fastening element embodying the present invention with a nailhead at its trailing end and a washer located on its axially extending leading region.

The fastening elements shown in FIGS. 1 and 2 are formed of an axially extending leading region 1, 11 with a diameter DB and a trailing region 2,12 with a diameter DA. The leading region 1,11 is to be driven into a receiving material, not shown. The leading region 1,11 has an axially extending cylindrically shaped shank 3,13 tapering to a tip 4,14 at its leading end, that is the end to be driven into the receiving material. During the driving operation, the leading region 1,11 of the fastening element is driven into a receiving material, not shown. This generates very high loads or stresses. To prevent the fastening or leading region 1,11 from deforming, it must have a very high strength. The trailing region 2,12 serves to fix an object, not shown, to the receiving material. The trailing region 2,12 must have a higher toughness than the leading region 1,11 so that jerk-like dynamic tensile forces can be elastically absorbed by the fastening element without damaging it.

An initial material 6,16 is used for manufacturing the fastening elements in FIGS. 1 and 2 and is formed of a nitrogen alloy, austenitic steel wire having a high corrosion resistance and a strength below the maximum attainable strength of such type of steel. The initial or starting material 6,16 has a hardness in the range of 35–43 Rockwell C hardness. The diameter of the starting material 6,16 corresponds essentially to the finished diameter DA of the trailing region 2,12.

As shown in FIG. 1, the initial material has a length LR shown in FIG. 1 in part by dashed lines. An axially extending region of the initial material 6 is cold-hardened by cold extrusion so that a leading region 1 is formed with a diameter DB smaller than the diameter DA of the trailing region 2. The hardness of the leading region 1 is in range of 46–55 Rockwell C hardness and is thus harder or has a greater hardness than the trailing region 2, the cold extruded leading region 1 tapers inwardly in the leading direction to a tip 4.

It is possible to provide the trailing region 2 with an outside thread 5, because of the lower hardness of such region. An object can be detachable secured on the outside thread of the fastening element which has been driven into a receiving material.

The starting material 16, as shown in FIG. 2 has an axial length LR which is shown, at least in part by dashed lines. The leading region 11 of the starting material 16 is cold hardened by means of cold extrusion so that the leading region 11 formed has a diameter DB smaller than the diameter DA of the trailing region 12, formed as nailhead. The hardness of the leading region 11 is in the range of 46–55 Rockwell C hardness and thus has a higher hardness than the trailing region 12. The cold extruded leading region 11 tapers inwardly in the leading or driving direction to a tip 14.

The leading regions 1,11 of the fastening elements shown in FIGS. 1 and 2 are laterally enclosed by a washer 7,17 which is in fictionally locked engagement with the leading region. The outside diameter of the washer 7,17 corresponds substantially to the outside diameter of the trailing region 2,12. The washer 7,17 serves to center the fastening element when it is positioned in the bore of a guide sleeve in an explosive powder charge operated setting tool, not shown. The outside diameter of the washer 7,17 can be greater than the diameter of the trailing region 12.

While specific embodiments of the invention have been shown and described in detail to illustrate the invention principles, it will be understood that the invention may be embodied otherwise without departing from such principles.

What is claimed is:

1. A fastening element for securing an object to a hard receiving material is formed of a unitary axially extending section of an initial material (6, 16) having a diameter (DA), a length (LR) and a Rockwell C hardness, a first axially extending part of said section is deformed and elongated by one of cold extrusion and hammering into an axially extending leading region to be driven into the receiving material and having a diameter (DB) smaller than the diameter (DA) of said initial material and a Rockwell C hardness in the range of 46–55, and a remaining second axially extending part of said section forming a trailing region extending axially from said leading region and having a larger diameter than and projecting radially outwardly from said leading region, said trailing region arranged to project axially outwardly from the receiving material, and said trailing region having a diameter approximately equal to the diameter (DA) of said section of the initial material and a Rockwell C hardness in the range of 35–43 approximately equal to the Rockwell C hardness of said section of the initial material.

2. A fastening element, as set forth in claim 1, wherein, the trailing region (2,12) has a degree of deformation in the range of 20–55% and the leading region (1,11) has a degree of deformation in the range of 70% to 80%.

3. A fastening element, set forth in claim 1 or 2, wherein said leading region (1,11) is formed as an axially extending cylindrically shaped shank (3,13) tapering inwardly to an end of the leading region spaced form the trailing region.

4. A fastening element, set forth in claim 3, wherein said trailing region has an outside thread (2).

5. A fastening element, set forth in claim 3, wherein the trailing region (12) is shaped as a nailhead (15).

6. A fastening element, set forth in claim 1 or 2, wherein the fastening element is formed of a nitrogen alloy, austenitic steel having the following content:

2–22% Nn
1–3% Mo 0.2–1.2% N

15%–26% Cr

0–17% Ni.

7. A method of forming a fastening element for securing an object to a hard receiving material comprising the steps of deforming by one of cold extrusion and hammering an axially extending part of an axially extending section of an initial material having a diameter (DA), an axial length (LR) and a Rockwell C hardness into a leading region having a smaller diameter than the diameter (DA) of the initial material and a Rockwell C hardness in the range of 46–55 greater than the Rockwell C hardness of the initial material and forming the remaining axially extending part of said section of the initial material for maintaining the object to the receiving material with the remaining axially extending part having a diameter approximately equal to the diameter of said section of initial material and a Rockwell C hardness in the range of 35–43 approximately equal to the Rockwell C hardness of the initial material.

* * * * *